United States Patent [19]

Mitsuno et al.

[11] Patent Number: 5,590,108
[45] Date of Patent: Dec. 31, 1996

[54] ENCODING METHOD AND APPARATUS FOR BIT COMPRESSING DIGITAL AUDIO SIGNALS AND RECORDING MEDIUM HAVING ENCODED AUDIO SIGNALS RECORDED THEREON BY THE ENCODING METHOD

[75] Inventors: Makoto Mitsuno, Chiba; Kenzo Akagiri, Kanagawa; Hiroshi Suzuki, Saitama; Osamu Shimoyoshi, Kanagawa, all of Japan

[73] Assignee: Sony Corporation, Tokyo, Japan

[21] Appl. No.: 240,234

[22] Filed: May 10, 1994

[30] Foreign Application Priority Data

May 10, 1993 [JP] Japan .................................. 5-108006

[51] Int. Cl.$^6$ ........................................................ G11B 7/00
[52] U.S. Cl. ........................... 369/59; 369/47; 369/124; 360/48; 360/53; 358/426; 395/2.38; 395/2.39
[58] Field of Search ..................................... 369/59, 60, 47, 369/48, 49, 54, 58, 32, 124; 360/48, 49, 45, 53, 55; 358/433, 426, 427, 432; 395/2.38, 2.12, 2.39

[56] References Cited

U.S. PATENT DOCUMENTS

| | | | |
|---|---|---|---|
| 3,973,081 | 8/1976 | Hutchins | 380/3 |
| 4,184,049 | 1/1980 | Crochiere et al. | 179/1 SA |
| 4,455,649 | 6/1984 | Esteban et al. | 370/80 |
| 4,535,472 | 8/1985 | Tomcik | 381/31 |
| 4,748,579 | 5/1988 | Zibman et al. | 364/726 |
| 4,827,336 | 5/1989 | Acampora et al. | 358/135 |
| 4,896,362 | 1/1990 | Veldhuis et al. | 381/30 |
| 4,912,763 | 3/1990 | Galand et al. | 381/31 |

(List continued on next page.)

FOREIGN PATENT DOCUMENTS

| | | |
|---|---|---|
| 0145788A1 | 6/1985 | European Pat. Off. . |
| 0255111A2 | 2/1988 | European Pat. Off. . |
| 0289080A1 | 11/1988 | European Pat. Off. . |
| 0338781 | 4/1989 | European Pat. Off. . |
| 0348132 | 6/1989 | European Pat. Off. . |
| 0409248A2 | 1/1991 | European Pat. Off. . |
| 0424016A2 | 4/1991 | European Pat. Off. . |
| 0421259A2 | 4/1991 | European Pat. Off. . |
| 0420745A2 | 4/1991 | European Pat. Off. . |
| 0428156A2 | 5/1991 | European Pat. Off. . |
| 0516342A3 | 5/1992 | European Pat. Off. . |
| 0506394A2 | 9/1992 | European Pat. Off. . |
| 0525809A2 | 2/1993 | European Pat. Off. . |
| 63-110830 | 5/1988 | Japan . |
| 5-114888 | 5/1993 | Japan . |
| 6-29934 | 2/1994 | Japan . |
| 6-149292 | 5/1994 | Japan . |

OTHER PUBLICATIONS

1990 International Conference on Acoustics, Speech and Signal Processing, Albuquerque, New Mexico, 3d–6th Apr. 1990), vol. 2, pp. 1093–1096, IEEE New York, A. Sugiyama et al. Adaptive transform coding with an adaptive block size (ATC-ABS).

Frequenz, vol. 43, No. 9, Sep. 1989, pp. 252–256, Berlin, DE: B. Edler: "Codierung von Audiosignalen mit überlappender Transformation und adaptiven Fensterfunktionen" (Paragraph 4: Stuerung der Fensteradaption.

(List continued on next page.)

Primary Examiner—Georgia Y. Epps
Assistant Examiner—Muhammad N. Edun
Attorney, Agent, or Firm—Limbach & Limbach, LLP

[57] ABSTRACT

A method for encoding audio signals includes dividing input audio signals into a two-dimensional block of time and frequency and quantizing the two-dimensional blocks based upon bit allocation as determined for each of the two-dimensional blocks. Scale factors are calculated indicating characteristics of signal components for each of the plural two-dimensional blocks, and bit allocations are determined for a pre-set one of the two-dimensional blocks based upon the scale factor of the pre-set two-dimensional block and plural scale factors of plural ones of the two-dimensional blocks neighboring to said pre-set two-dimensional block on the frequency axis.

18 Claims, 9 Drawing Sheets

U.S. PATENT DOCUMENTS

| | | | |
|---|---|---|---|
| 4,932,062 | 6/1990 | Hamilton | 381/43 |
| 4,972,484 | 11/1990 | Theile et al. | 381/37 |
| 5,049,992 | 9/1991 | Citta et al. | 358/140 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/20 |
| 5,134,475 | 7/1992 | Johnston et al. | 358/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/155 |
| 5,185,800 | 2/1993 | Mahieux | 381/29 |
| 5,222,189 | 6/1993 | Fielder | 395/2 |
| 5,243,588 | 9/1993 | Maeda et al. | 369/54 |
| 5,244,705 | 9/1993 | Tsurushima et al. | 428/64 |
| 5,285,476 | 2/1994 | Akagiri et al. | 375/25 |
| 5,294,925 | 3/1994 | Akagiri | 341/50 |
| 5,301,205 | 4/1994 | Tsutsui et al. | 375/1 |
| 5,311,561 | 5/1994 | Akagiri | 375/122 |
| 5,367,608 | 11/1994 | Veldhuis et al. | 395/2.38 |
| 5,375,189 | 12/1994 | Tsutsui | 395/2.38 |
| 5,381,143 | 1/1995 | Shimoyoshi et al. | 341/51 |
| 5,388,209 | 2/1995 | Akagiri | 395/2.38 |
| 5,416,604 | 5/1995 | Park | 358/433 |
| 5,438,643 | 8/1995 | Akagiri et al. | 395/2.1 |

OTHER PUBLICATIONS

K. Brandenburg, et al, "ASPEC: Adaptive Spectral Perceptual Entropy Coding of High Quality Music Signals," AES, 90th Convention 1991 Feb. 19–22, Paris, pp. 1–10 and Figs. 1 and 2.

G. Davidson, et al., "Low–Complexity Transform Coder for Satellite Link Applications," AES, 89th Convention 1990 Sep. 21–25 Los Angeles, pp. 1–22.

J. D. Johnston, "Transform Coding of Audio Signals Using Perceptual Noise Criteria," IEEE Journal on Selected Areas in Communication, vol. 6, No. 2, Feb. 1988, pp. 314–323.

E. F. Schröder, et al., "High Quality Digital Audio Encoding with 3.0 Bits/Sample using Adaptive Transform Coding," AES, 80th Convention 1986 Mar. 4–7 Montreux, Switzerland, pp. 1–7.

D. Esteban, et al., "Application of quadrature Mirror Filters to Split Band Voice Coding Schemes," 1977 IEEE International Conference on Acoustics, Speech & Signal Processing, pp. 191–195.

G. Stoll, et al., "Masking–Pattern Adapted Subband Coding: Use of the Dynamic Bit–Rate Margin" AES, 8th Conference 199 Mar. 1–4 Paris, pp. 1–33.

J. H. Rothweiler, "Polyphase Quadrature Filters—A New Subband Coding Technique," 1983 IEEE, ICASSP 83, Boston, pp. 1280–1283.

R. E. Crochiere, et al., "Digital Coding of Speech in Sub–bands," 1976 American Telephone and Telegraph Company, The Bell System Technical Journal, vol. 55, No. 8, Oct. 1976, pp.1069–1085.

R. Zelinski, et al., "Adaptive Transform Coding of Speech Signals," IEEE Transactions on Acoustics, Speech and Signal Processing, vol. ASSP–25, No. 4, Aug. 1977, pp. 299–330.

M. A. Krasner, "The Critical Band Coder—Digital Encoding of Speech Signals Based on the Perceptual Requirements of the Auditory System," IEEE, ICASSP Proceedings 1980, pp. 327–331.

G. Theile, et al., "Low bit–rate coding of high–quality audio signals—An introduction to the MASCAM system," EBY Review/Technical, 1988 Aug. No. 230, Brussels, Belgium, pp. 158–181.

Y. Mahieux, et al., "Transform Coding of Audio Signals at 64 Kbits/s," 1990 IEEE, Globecom '90, IEEE Global Telecommunications Conference & Exhibit, pp. 0518–0522.

ENCODING METHOD AND APPARATUS FOR BIT COMPRESSING DIGITAL AUDIO SIGNALS AND RECORDING MEDIUM HAVING ENCODED AUDIO SIGNALS RECORDED THEREON BY THE ENCODING METHOD

BACKGROUND OF THE INVENTION

This invention relates to an encoding method and apparatus for bit compressing digital audio signals and, more particularly, to an encoding method and apparatus for changing bit allocation of a plurality of processing blocks in accordance with the energy shape in the processing blocks.

Among the techniques of bit compressing the input digital audio signals, there is such technique as disclosed in EP application Publication Number 0525809 A2 (date of publication of application, Mar. 2, 1993 Bulletin 93/05). According to this encoding technique, division of the block floating units is made along the frequency scale based upon the critical bands and sub-bands produced on further dividing or combining the critical bands. In view of psychoacoustic characteristics of the human hearing mechanism, it is most desirable to use units along the frequency scale which are in register with the critical bands. However, since the critical band widths become broader and narrower towards the higher and lower frequency ranges, respectively, the bands obtained by sub-dividing the critical bands are used for the higher frequency range and the critical bands or the bands combined from critical bands are used for the lower frequency range. For encoding, the values indicating the states showing the block floating states and the scale factors are calculated from one block floating unit to another and bit allocation is performed from one block floating unit to another using these values and the scale factors.

However, if the bands obtained by sub-dividing or combining the critical bands are used as the block floating units, the amounts of the masking effects in the critical bands cannot be calculated correctly, such that sufficient masking effects cannot be realized.

SUMMARY OF THE INVENTION

In view of the above-described status of the prior art, it is an object of the present invention to provide an encoding method and apparatus whereby digital audio signals may be bit-compressed more efficiently by utilizing the masking effects for the psychoacoustic characteristics of the human hearing mechanism more effectively.

It is another object of the present invention to provide an encoding method and apparatus whereby the sound quality may be prevented from being deteriorated at the low bit rate and may be improved for the same bit rate by more effectively utilizing the masking effects for the psychoacoustic characteristics of the human hearing mechanism.

The method for encoding audio signals according to the present invention comprises dividing input audio signals into a plurality of two-dimensional blocks of time and frequency and quantizing the two-dimensional blocks based upon bit allocation as determined for each of the two-dimensional blocks. The encoding method includes the steps of calculating scale factors indicating characteristics of signal components for each of the plural two-dimensional blocks, and determining bit allocation for a pre-set one of the two-dimensional blocks based upon the scale factor of the pre-set two-dimensional block and plural scale factors of plural two-dimensional blocks neighboring to the preset two-dimensional block on the frequency axis. The bit allocation for the two-dimensional block is determined on the basis of the representative scale factor value as calculated for each of the scale factor values for each critical band.

The apparatus for encoding audio signals according to the present invention comprises dividing input audio signals into a plurality of two-dimensional blocks of time and frequency and quantizing the two-dimensional blocks based upon bit allocation as determined for each of the two-dimensional blocks. The encoding apparatus includes means for calculating scale factors indicating characteristics of signal components for each of the plural two-dimensional blocks, and means for determining bit allocation for a pre-set one of the two-dimensional blocks based upon the scale factor of the pre-set two-dimensional block and plural scale factors of plural two-dimensional blocks neighboring to the pre-set two-dimensional block on the frequency axis. The bit allocation means of the encoding apparatus includes means for calculating representative scale factor values for each critical band based upon calculated values of the plural scale factors, and means for determining bit allocation for the pre-set two-dimensional block based on the representative scale factor values. With the present encoding apparatus, if the band width on the frequency domain of the two-dimensional block is narrower than the critical band, the maximum or mean value of the plural scale factors is adopted by the representative scale factor value calculating means as a representative scale factor value for each critical band. On the other hand, if the band width on the frequency axis of the two-dimensional block is broader than the critical band, the scale factor of the pre-set two-dimensional block is adopted by the representative scale factor value calculating means as a representative value for plural critical bands. The representative scale factor value of the pre-set critical band and plural representative scale factor values of plural critical bands neighboring to the pre-set critical band on the frequency axis are weighted by the representative value calculating means for adjusting the representative scale factor value of the pre-set critical band.

The recording medium having encoded audio signals recorded thereon according to the present invention is produced by dividing input audio signals into plural two-dimensional blocks of time and frequency, calculating a scale factor indicating characteristics of signal components for each of the plural two-dimensional blocks, determining bit allocation for a pre-set one of the two-dimensional blocks based upon the scale factor of the pre-set two-dimensional block and plural scale factors of plural two-dimensional blocks neighboring to the pre-set two-dimensional block on the frequency axis, quantizing the two-dimensional blocks based upon the determined bit allocation for generating encoded audio signals, and recording the encoded audio signals on the recording medium.

The method and apparatus for decoding encoded audio signals according to the present invention includes dividing input audio signals into plural two-dimensional blocks of time and frequency, calculating a scale factor indicating characteristics of signal components for each of the plural two-dimensional blocks, receiving the information concerning bit allocation of the pre-set two-dimensional block as determined based upon the scale factor of the pre-set two-dimensional block and plural scale factors of plural two-dimensional blocks neighboring to the pre-set two-dimensional block on the frequency axis, and decoding the encoded audio signals, previously quantized based upon the information concerning the bit allocation, with the aid of the information concerning the bit allocation.

Other objects and advantages of the present invention will become apparent from the following description which is hereinafter made in conjunction with the drawings.

DETAILED DESCRIPTION OF THE PREFERRED EMBODIMENTS

Figure 1:
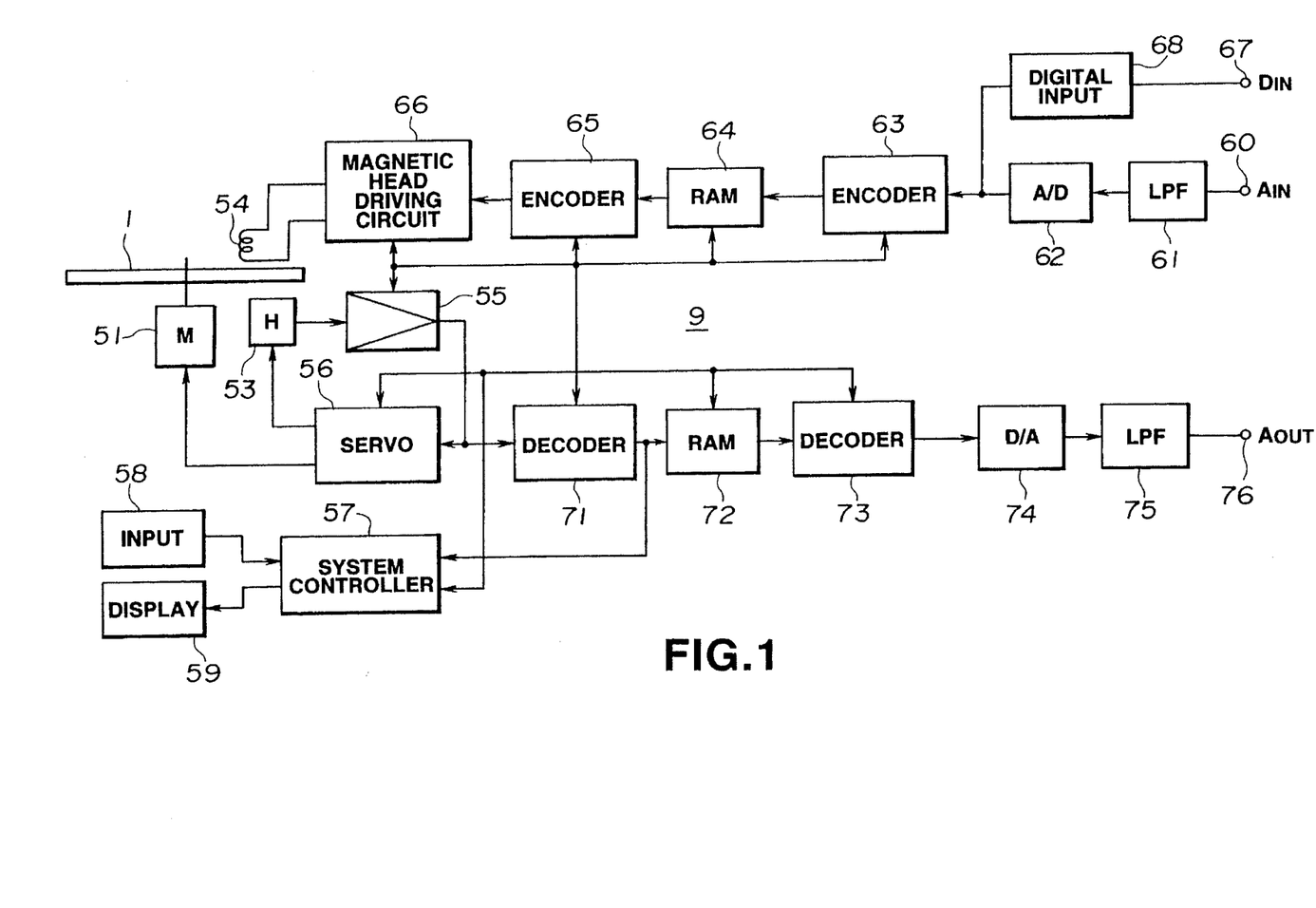
FIG. 1 is a block circuit diagram showing a constitutional example of a disc recording and reproducing apparatus embodying the recording/reproducing apparatus for compressed data according to the present invention.

FIG. 1 shows, in a block circuit diagram, a schematic arrangement of a compressed data recording and/or reproducing apparatus embodying the present invention.

In the compressed data recording and/or reproducing apparatus, shown in FIG. 1, a magneto-optical disc 1 rotationally driven by a spindle motor 51, is employed as a recording medium. When recording data on the magneto-optical disc 1, the magnetic field modulated in accordance with the recording data is applied by a magnetic head 54, while a laser light beam is radiated by an optical head 53, for so-called magnetic-field modulation recording, in order to record the data along the recording track of the magneto-optical disc 1. When reproducing the recorded data, the recording tracks on the magneto-optical disc 1 are traced by the laser light beam from the optical head 53 for photo-magnetically reproducing the recorded data.

The optical head 53 is made up of a laser light source, such as a laser diode, optical components, such as a collimator lens, an objective lens, a polarized beam splitter or a cylindrical lens, and a photodetector having a light receiving section having a pre-set pattern. The optical head 53 is mounted facing the magnetic head 54 with the magneto-optical disc 1 in-between. For recording data on the magneto-optical disc 1, the magnetic head 54 is driven by a head driving circuit 66 of a recording system as later described for applying a magnetic field modulated in accordance with the recording data. On the other hand, the laser light beam is radiated on the target track on the magneto-optical disc 1 for thermo-magnetic recording in accordance with the magnetic-filed modulation system. The optical head 53 also detects the laser light reflected from the target track for detecting the focusing error by the astigmatic method and for detecting the tracking error by the push-pull method. For reproducing the recorded data from the magneto-optical disc 1, the optical head 53 detects the focusing errors and the tracking errors, while simultaneously detecting the difference in the angle of polarization (Kerr rotation angle) of the laser light reflected from the target track for generating the playback signals.

The output of the optical head 53 is supplied to an RF circuit 55 which extracts the above-mentioned focusing and tracking error signals from the output of the optical head 53 and transmits the extracted signals to a servo control circuit 56 while converting the playback signals into hi-level signals which ar routed to a decoder 71 of the playback system as later described.

A servo control circuit 56 is made up of, for example, a focusing servo control circuit, a tracking servo control circuit, a spindle motor servo control circuit and a thread servo control circuit. The focusing servo control circuit focusing controls the optical system of the optical head 53 so that the focusing error signal becomes equal to zero. The tracking servo control circuit tracking controls the optical system of the optical head 53 so that the tracking error signal becomes equal to zero. The spindle motor servo control circuit controls the spindle motor 51 for rotationally driving the magneto-optical disc 1 at a pre-set rotational velocity, for example, at a constant linear velocity. The thread servo control circuit causes the optical head 53 and the magnetic head 54 as far as the target track position on the magneto-optical disc 1 as designated by the system controller 57. The servo control circuit 56, taking charge of these control operations, transmits the information indicating the operating states of the various components controlled by the servo control circuit 56 to the system controller 57.

To the system controller 57 are connected a key input operating unit 58 and a display unit 59. The system controller 57 controls the recording system and the reproducing system with the operating mode as designated by the operating input information entered at the input operating unit 58. The system controller 57 also manages the recording position and the reproducing position on the magneto-optical disc 1 traced by the optical head 53 and the magnetic head 54 based upon the sector-based address information reproduced from the recording tracks on the magneto-optical disc 1, inclusive of Q-data, such as sub-code data or the header time. The system control let 57 also causes the playback time to be displayed on the display unit 59 based upon the data compression ratio and the playback position information on the recording track.

The reproducing time displayed on the display unit 59 is the actual time information as found by multiplying the sector-based address information (absolute time information) reproduced from the recording track on the magneto-optical disc 1, such as the header time or the sub-code Q-data, by the reciprocal of the data compression ratio, which is equal to 4 in case of data compression by ¼. If the absolute time information is previously recorded on the recording tracks of, for example, the magneto-optical disc 1, it is possible to display the current position by the actual recording time during recording by reading the pre-formatted absolute time information and multiplying it with the reciprocal of the data compression ratio.

In the recording system of the recording/reproducing unit of the present disc recording/reproducing apparatus, an analog audio input signal AIN from an input terminal 60 is supplied via a low-pass filter 61 to an A/D converter 62 which then quantizes the analog audio input signals AIN. The digital audio signals from the A/D converter 62 are routed to an adaptive transform coder (ATC encoder) 63. The ATC encoder 63 effectuates bit compression (data compression) on digital audio PCM data at a pre-set transfer speed, which is the above-mentioned input signal AIN as quantized by the A/D converter 62, or on the digital audio input signals DIN. Although the compression ratio herein is equal to four, the present embodiment is not dependent on this specific value of the compression factor which may be arbitrarily selected depending on particular applications.

A memory 64 is controlled by the system controller 57 as to data writing and recording and is designed as a buffer memory for temporarily storing the ATC data supplied from the ATC encoder 63 and for recording the stored data on the disc whenever the necessity arises. That is, the compressed audio data supplied from the ATC encoder 63 has its data transfer rate lowered to one-fourth of the data transfer rate for the standard CD-DA format of 75 sectors/second, or to 18.75 sectors/second. It is these compressed data (ATC data) that is continuously recorded in the memory 64. It suffices to record one of the four sectors of the compressed data (ATC data), as mentioned hereinabove. However, since the recording of every four sectors is virtually infeasible, sector-continuous recording is performed, as will be explained subsequently. The recording is performed in a burst fashion at the same data transfer rate as in the standard CD-DA format, or at 75 sectors/second, with a cluster made up of a pre-set plural number of sectors, such as 32 plus several sectors, as a recording unit, with the interposition of a non-recording period. That is, the ATC audio data, recorded continuously by the memory 64 with the low transfer rate of 18.75 sectors/second associated with the bit compression rate, is read out as the recorded data in the burst fashion at the low rate of 75 sectors/second. The overall data transfer rate for the read-out and recorded data, inclusive of the non-recording period, is the above-mentioned low rate of 18.75 sectors/second. However, the instantaneous data transfer rate within the burst-like recording operation is the above-mentioned standard rate of 75 sectors/second. Consequently, it is when the rotational velocity of the disc is equal to that of the standard CD-DA format, that is the constant linear velocity, that the recording is made at the same recording density and with the same recording pattern as those of the CD-DA format.

The ATC audio data, that is the recorded data, as read out in the burst fashion from the memory 64 at the above-mentioned instantaneous transfer rate of 75 sectors/second, is supplied to an encoder 65. In a data string supplied from the memory 64 to the encoder 65, each continuous data recording is made based upon a unit consisting of a cluster made up of plural sectors, such as 32 sectors, and several cluster-linking sectors. The cluster-linking sector has a length set so as to be longer than the interleaving length at the encoder 65, so that interleaving may be performed without any effects on data of the adjacent clusters.

The encoder 65 effectuates encoding operations, such as parity data addition and interleaving, and EFM encoding, on the recording data supplied in a burst fashion from the memory 64, as described hereinabove. The recording data thus encoded by the encoder 65 are supplied to a magnetic head driving circuit 66. The magnetic head driving circuit 66 has the magnetic head 54 connected thereto and actuates the magnetic head 54 for applying the modulated magnetic field corresponding to the recording data to the magneto-optical disc 1. In addition to performing the above-mentioned memory control for the memory 64, the system controller 57 performs the control of the recording positions so that the recording data read out in the burst fashion by the memory control from the memory 64 will be continuously recorded on the recording tracks of the magneto-optical disc 1. Such control of the recording positions is performed by the system controller 57 managing the recording position of the recording data read out in the burst fashion from the memory 64 and routing the control signal designating the recording position on the recording tracks of the magneto-optical disc 1 to the servo control circuit 56.

The reproducing system of the present magneto-optical disc recording/reproducing unit is now explained. The reproducing system reproduces the recording data continuously recorded on the recording tracks of the magneto-optical disc 1 by the above-described recording system, and includes a decoder 71 fed with hi-level signals converted by the RF circuit 55 from the playback output produced by the laser light beam from the optical head 53 tracing the recording tracks of the magneto-optical disc 1. It is noted that reproduction may be made not only of the magneto-optical disc 1 but also of a read-only optical disc having a diameter of 12 cm.

The decoder 71 is a counterpart of the encoder 65 of the above-mentioned recording system, and effectuates the above-mentioned decoding for error correction of or EFM decoding on the bi-level playback output from the RF circuit 55 for reproducing the ATC audio data at the transfer rate of 75 sectors/second which is faster than the normal transfer rate. The playback data outputted by the decoder 71 is routed to a memory 72.

The memory 72 is controlled by the system controller 57 as to data readout and recording such that the playback data supplied from the decoder 71 at the transfer rate of 75 sectors/second is recorded in a burst fashion at the transfer rate of 75 sectors/second. In addition, the playback data recorded in the burst fashion at the above-mentioned transfer rate of 75 sectors/second are continuously read out from the memory 72 at the normal transfer rate of 75 sectors/second.

The system controller 57 controls the memory 72 such that the playback data are recorded in the memory 72 at the transfer ate of 75 sectors/second and are continuously read out therefrom at the transfer rate of 18.75 sectors/second. Besides, the system controller 57 effectuates the above-mentioned control for the memory 72, but controls the playback position so that the playback data recorded in the burst fashion from the memory 72 will be continuously reproduced from the recording tracks of the magneto-optical disc 1. In addition to performing the above-mentioned control operations for the memory 72, the system controller 57 controls the playback position such that the playback data recorded in the burst fashion from the memory 72 will be continuously reproduced from the recording tracks of the magneto-optical disc 1. For controlling the playback position in this manner, the playback position of the playback data read out in a burst fashion from the memory 72 by the system controller 57 is managed so that a control signal designating the playback position on the recording tracks of the magneto-optical disc 1 or the optical disc 1 will be routed to the servo control circuit 56.

The ATC audio data, obtained as the playback data continuously read out from the memory 72 at the transfer rate of 18.75 sectors/second, are routed to an ATC decoder 73. The ATC decoder 73 reproduces 16-bit digital audio data by data expanding (bit expanding) the ATC data by a factor of four. The digital audio data from the ATC decoder 73 is routed to a D/A converter 74.

The D/A converter 74 converts the digital audio data supplied from the ATC decoder 73 into analog signals for producing an analog audio output signal AOUT. The analog audio signal AOUT from the D/A converter 74 is outputted via a low-pass filter 75 at an output terminal 76.

The high efficiency compression coding by the encoder 63, as employed in the present apparatus, that is the technique of high efficiency encoding of input digital signals, such as audio PCM signals, with the aid of sub-band coding (SBC), adaptive transform coding (ATC) or the adaptive bit allocation, is hereinafter explained by referring to FIGS. 2 ff.

Figure 2:
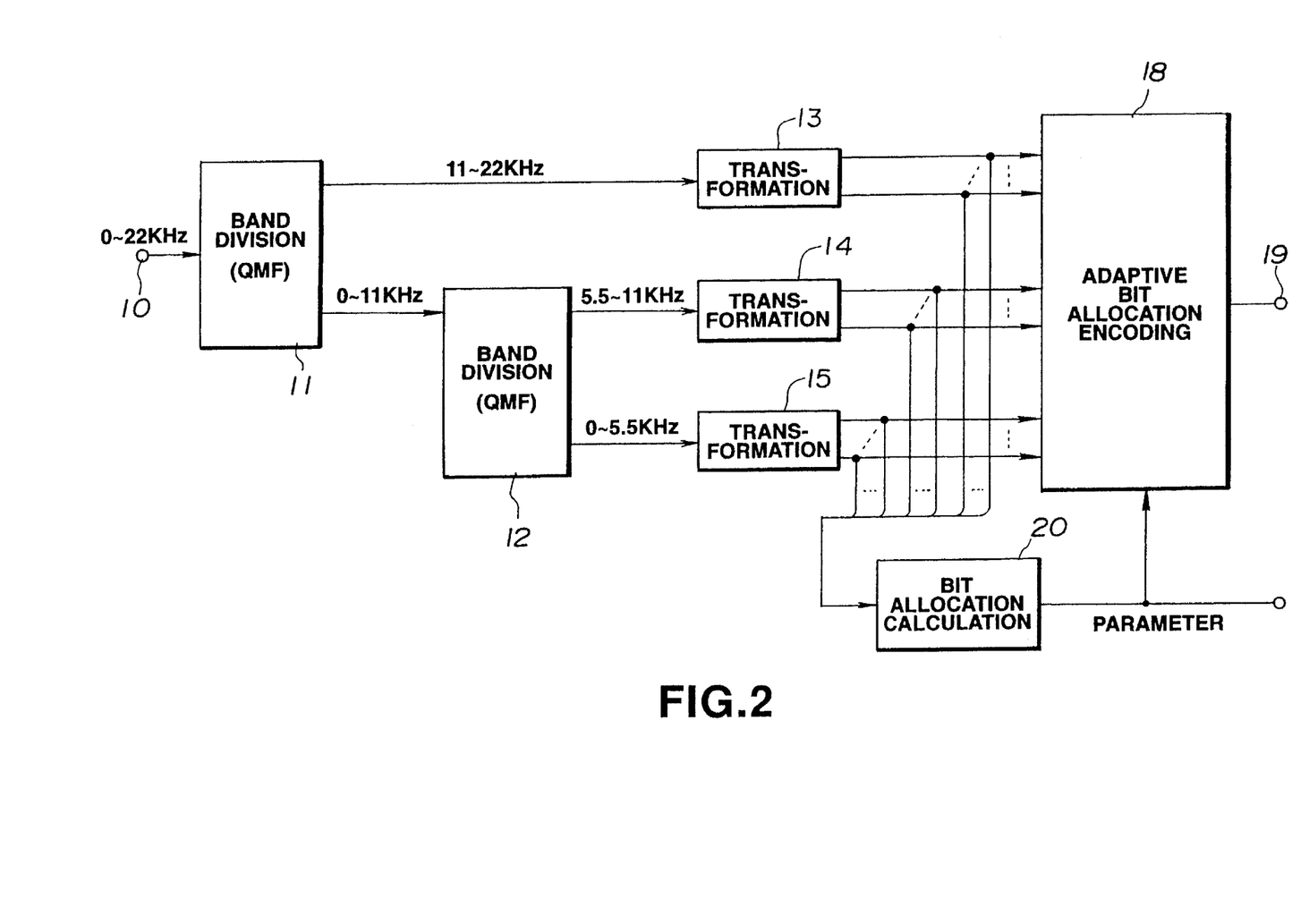
FIG. 2 is a block circuit diagram showing a concrete example of a high efficiency encoder which may be employed for bit rate compression encoding according to the present invention.

In the high efficiency encoding apparatus, shown in FIGS. 2 ff, the input digital signals are divided into plural frequency ranges. The signals in each range are orthogonally transformed, with the bandwidths of the two lowest ranges remaining equal and with the bandwidths being selected to be broader towards the higher frequencies. The block size or length for orthogonal transform is adaptively variable depending on the input signals. The spectral data on the frequency domain, as produced by the orthogonal transform, is divided so that the critical bands which take the psychoacoustic characteristics of the human hearing mechanism into account, or the bands combined from plural cortical bands, are used as the block floating bandwidths for the low range and so that the critical bands are used as the block floating bandwidths for the mid to high frequency ranges. Bit allocation is adaptively made, by way of block floating, for each of the two-dimensional block floating units, in which the above-mentioned block size is the unit along the time scale and the block floating bandwidths are the units along the frequency scale. The block floating unit usually becomes the block subject to quantization noise. The block size data is also transmitted as the encoding subsidiary information.

Referring to FIG. 2, audio PCM signals in a range of from 0 to 22 kHz are supplied to an input terminal 10 for the sampling frequency of 44.1 kHz. These input signals are divided by a band-dividing filter 11, such as a QMF filter, into a band of 0 to 11 kHz and a band of 11 to 22 kHz. The signals in the range of 0 to 11 kHz are further divided by a band dividing filter, such as a QMF filter 12, into a band of 0 to 5.5 kHz and a band of 11 to 22 kHz. The signals From the band-dividing filter 11, with the frequency of 11 to 22 kHz, are routed to a MDCT circuit 13, which is an example of an orthogonal transform circuit. The signals from the band-dividing filter 12, with the frequency range of from 5.5 kHz to 11 kHz, are routed to a MDCT circuit 14, while the signals from the band-dividing filter 12, with the frequency range of from 0 to 5.5 kHz, are routed to a MDCT circuit 15, for MDCT processing.

Among means for dividing the input digital signals into plural frequency bands, there is a QMF filter, as disclosed for example in 55 Bell Syst. "Digital Coding of Speech in Sub-bands" by R. E. Crochiere (1976). The method for dividing input signals into equal band signals is discussed in Polyphase Quadrature Filters—A new Sub-band Coding Technique, by Joseph H Rothweiler, ICASSP 1983. The above-mentioned orthogonal transform may be typified by, for example, an orthogonal transform in which the input audio signals are blocked with a pre-set unit time (frame) and the signals of each block are processed with fast Fourier transform (FFT), cosine transform (DCT) or modified DCT (MDCT) for transforming the signal from the time axis into the frequency axis. The MDCT is discussed in Subband/Transform Coding Using Filter Bank Designs Based on Time Domain Aliasing Cancellation, by J. P. Princen and A. B. Bradley, ICASSP 1987.

Returning to FIG. 2, the spectral data on the frequency domain, produced by MDCT by the MDCT circuits 13, 14 and 15, or MDCT coefficient data, are routed to an adaptive bit allocation encoding circuit 18. The spectral data are grouped for each critical band or a frequency band synthesized from plural critical bands for the low frequency range, and are grouped for a frequency band sub-divided from the critical band for the mid to high ranges, in order to take account of the effectiveness of the block floating.

A critical band is a frequency band that takes advantage of the psychoacoustic characteristics of the human hearing mechanism. A critical band is the band of noise that can be masked by a pure sound that has the same intensity as the noise and has a frequency in the vicinity of the frequency of the noise. The width of the critical band increases with increasing frequency of the pure sound. The entire audio frequency range of 0 Hz to 22 kHz can be divided into, for example, 25 critical bands.

A bit allocation calculating circuit 301 finds the masking quantity for each block floating unit, based upon the spectral data divided into block floating units, taking into account the so-called band-to-band masking effects, and also finds the number of allocated bits for each block floating unit, based upon the energy or peak values for each block floating unit, for requantizing each spectral data or each MDCT coefficient data, depending on the number of bits allocated to each unit by the adaptive bit allocation encoding circuit 18. The data encoded in this manner is outputted via output terminal 19.

Figure 3:
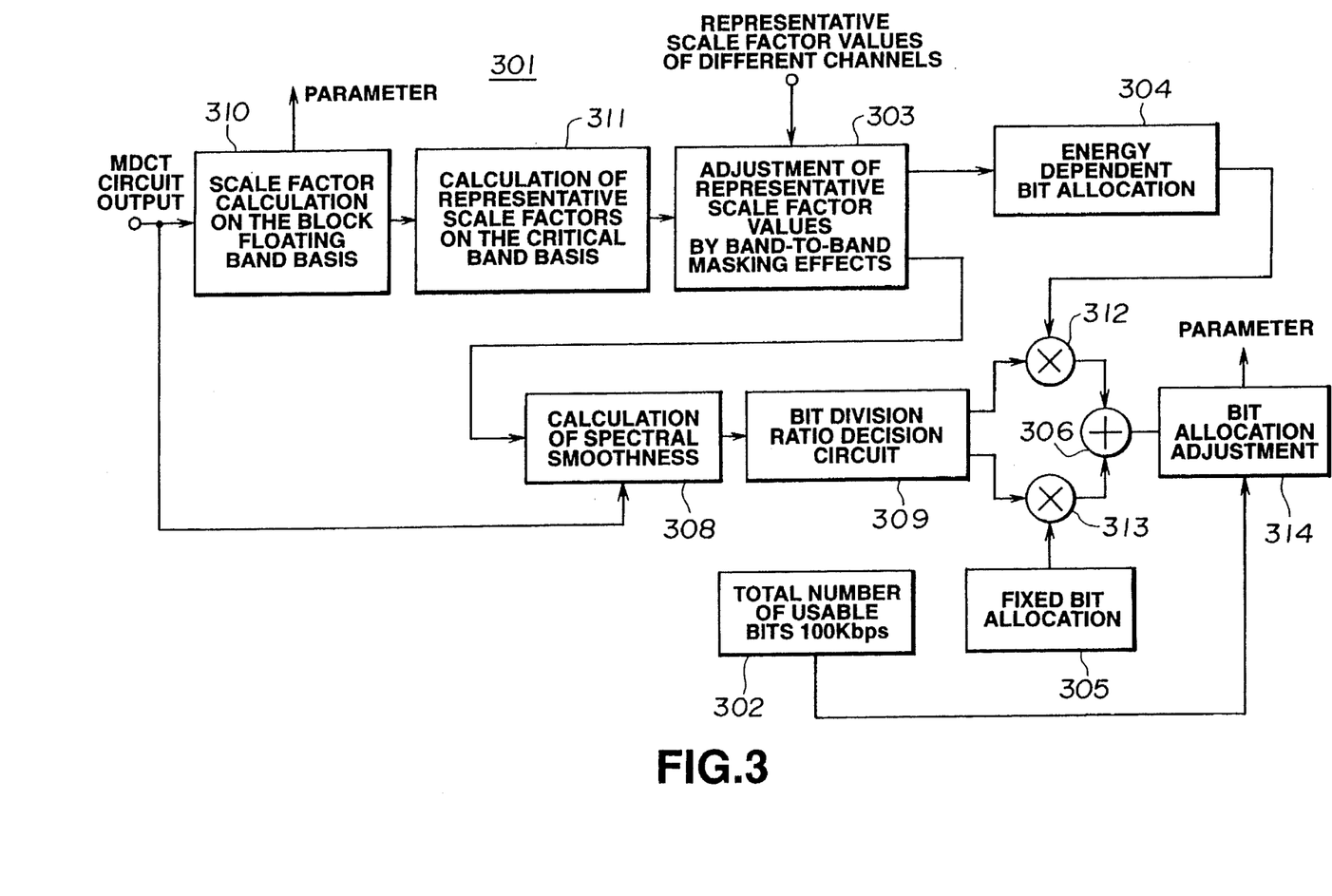
FIG. 3 is a block diagram showing a second method for bit distribution, that is a method for bit allocation according to a modification.

Referring to FIG. 3, showing an arrangement of the adaptive bit allocation circuit 301, the operation of bit allocation is explained.

Outputs of the MDCT circuits 13 to 15 are supplied to an input terminal 300 of the adaptive bit allocation circuit 301. In the adaptive bit allocation circuit 301 of FIG. 3, the number of bits which represent the MDCT coefficients and which may be employed for transmission or recording, is set to 100 Kbps. Data indicating the total number of usable bits is generated by a circuit for generating the total number of usable bits 302. A plurality of bit allocation patterns are provided for fixed bit allocation so as to be selectively used depending on signal characteristics. Data indicating the fixed bit distribution patterns are generated by a fixed bit distribution circuit 305.

In FIG. 3, the signals supplied to the input terminal 300 are routed to a scale factor calculating circuit 310 for calculating the scale factor for each block floating unit. The scale factor calculating circuit 310 for calculating the scale factor for each block floating unit calculates the scale factor indicating the energy or peak values for each block floating unit from the outputs of the MDCT circuits 13 to 15. The calculated values of the scale factors are routed as encoding parameters to the adaptive bit allocation encoding circuit 18. The scale factor values are also transmitted as the subsidiary encoding information.

The scale factor for each block floating unit is routed to a circuit 311 for calculating representative scale factors on the cortical band basis. The scale factor representative value calculating circuit 311 finds the scale factor for each block floating unit having the same time scale unit and groups these scale factors according to the bands corresponding to the critical bands and calculates representative values of the scale factors at a rate of one scale factor for each critical band. These representative scale factor values are employed as indices for determining the bit allocation for the respective block floating units.

Figures 4A, 4B:
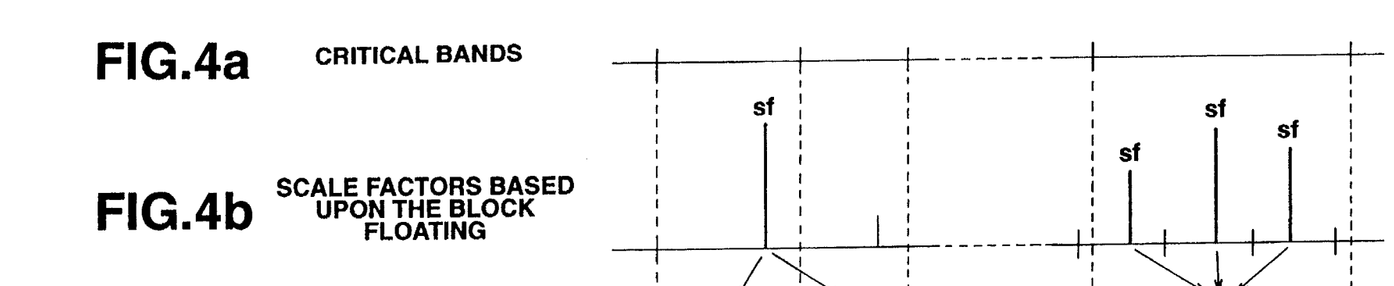
FIGS. 4A–4C show how the representative scale factor values for each critical band is calculated from the scale factor for each block floating band.
Figure 4C:
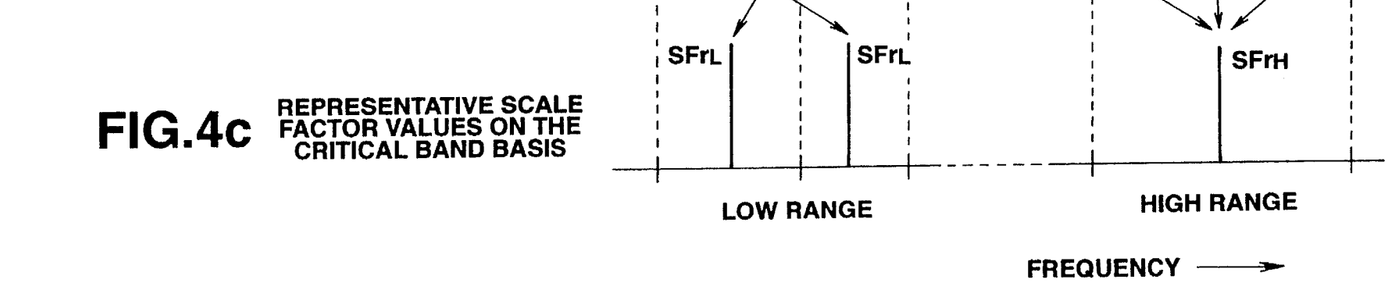

This will now be explained by referring to FIG. 4. As shown at a and b in FIG. 4, the block floating bandwidth, shown at b in FIG. 4, is narrower for the higher frequency range than the critical band width shown at a in FIG. 4. For this reason, the representative scale factor calculating circuit 311 groups together a plurality of block floating ranges, corresponding to a critical band, for higher frequency ranges, and calculates a representative scale factor value $SF_{rH}$ for the critical band under consideration from the scale factors sf of the block floating units. On the other hand, since the block floating bandwidth is broader for the low frequency range than the critical bandwidth, as shown at a and b in FIG. 4, the representative scale factor calculating circuit 311 divides the block floating bandwidth into bands corresponding to the critical bands, as shown at c in FIG. 4, and calculates representative values of the scale factors $SF_{rL}$ for the bands corresponding to the critical bands from the scale factors sf of the block floating units. For calculating the representative values of the scale factors by the representative scale factor value calculating circuit 311, the maximum or mean values of the respective scale factors in the critical bands for the high frequency range may be used for calculation, while the values equivalent to the scale factors of the associated block floating units may be used as representative scale factor value for each critical band.

Output data from the representative scale factor value calculating circuit 311 are routed to a circuit for adjustment of representative scale factor values by band-to-band masking effects 303. The adjustment circuit 303 adjusts the representative scale factor values, taking the band-to-band masking effects into account, by having reference to plural high and low representative scale factor values. Meanwhile, the band-to-band masking effects mean the masking effects acting between adjacent bands. More specifically, the band-to-band masking effects, a kind of psychoacoustic characteristics of the human hearing mechanism, mean a phenomenon in which, if the energies in the plural high and low critical bands neighboring to a critical band under consideration are significantly larger than those of the critical band under consideration, the sound in the critical band under consideration becomes masked to a certain extent by the high and low critical bands.

Figure 5A:
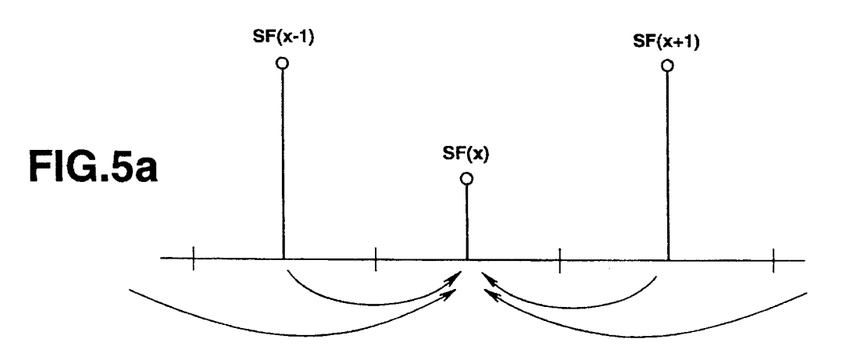
FIGS. 5A and 5B show how a representative scale factor value is adjusted in consideration of the band-to-band masking effects and with reference to plural high and low range representative scale factor values.

Referring to FIG. 5, the adjustment of the representative scale factor values by the representative scale factor adjustment circuit 303 is explained by referring to FIG. 5. If the representative scale factor value of a band under consideration is SF(x) and plural representative scale factor values neighboring to the band are SF(x−1) and SF(x+1), as shown at a in FIG. 5, respectively, the representative scale factor adjustment circuit 303 refers to plural representative scale factor values SF(x−1), SF(x+1) neighboring to the band under consideration and performs convolution by multiplying these representative values by a pre-set weighting coefficient and summing the resulting values to the representative scale factor value SF(x) of the band under consideration. The convolution may be represented by the following equation (2):

$$SF'(x) = \sum_{n=b}^{e} \alpha(n) SF(x+n) \quad (2)$$

In the above equation (2), SF'(x) is the representative scale factor value after adjustment, α(n) is a weighting function, and variables n, x, b and e are integers. It is noted that SF(x) in FIG. 5 and the equation (2) indicates a representative scale factor value on the high frequency side with increase in the value of the number x.

The weighing function α(n) is a function which maps a larger value as n approaches to zero. The function is designed so as to map the largest value when n=1. This is derived from the properties of the band-to-band masking effects in which the closer a band is to a critical band, the more the band is affected by the lower side neighboring critical band. Although the same weighting function may be employed, it may be changed depending on the frequency and/or the amplitude, for utmost effects. In the above equation (2), different integers are used as the variables b and e depending on the frequency ranges. In other words, the numbers of the representative scale factor values to be convolved may be changed depending on the frequency ranges. Since the representative scale factor value on the low frequency side affects the representative scale factor value under consideration more significantly than that on the high frequency side, the mean value of the two variables b and e assumes a negative value.

Figure 5B:
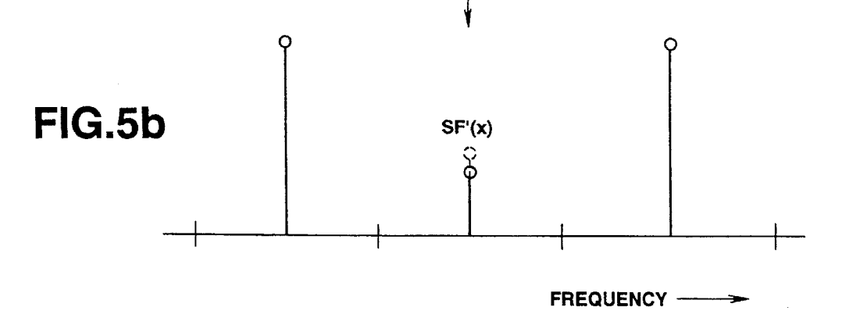

By the above-described operations, the representative scale factor adjustment circuit 303 adjusts the representative scale factor value of the critical band which becomes less audible due to the band-to-band masking effect to a lower value, as shown at b in FIG. 5, while adjusting the representative scale factor value of the critical band not masked by the band-to-band masking effect to a higher value. In this manner, the adjusted representative scale factor value SF'(x) is produced.

Figure 6A:
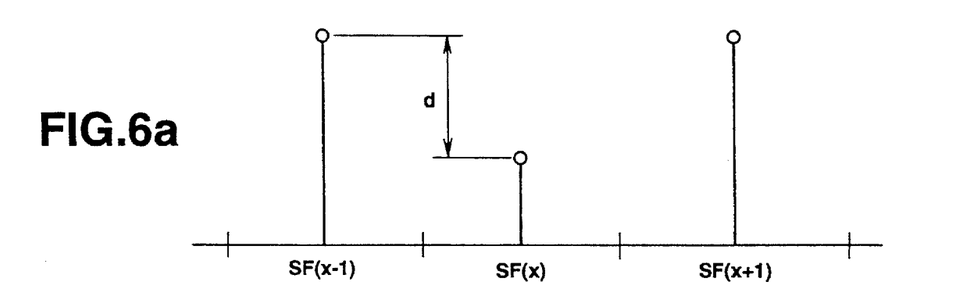
FIGS. 6A and 6B show how a representative scale factor value under consideration is adjusted in view of the band-to-band masking effects to a lower value if a difference obtained by subtracting the representative scale factor value from the low range side representative scale factor value neighboring thereto exceeds a certain threshold.
Figure 6B:
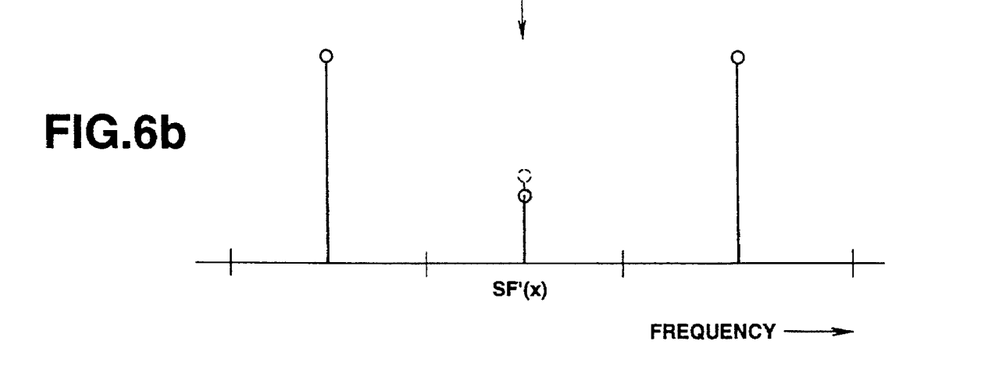

Referring to FIG. 6, the method of adjusting the representative scale factor value by taking advantage of the band-to-band masking effects in a manner different from the above-described embodiment is now explained.

In the adjustment method, shown in FIG. 6, the representative scale factor value SF(x) of a critical band under consideration is compared to lower side representative scale factor values SF(x−1) and SF(x+1) neighboring thereto. If a difference value d obtained by subtracting the representative scale factor value of the band under consideration from that on the low frequency side exceeds a preset value, the representative scale factor value of the band under consideration is multiplied by a weighting function so that the representative scale factor value of the band under consideration will assume a lower value. This process may be represented by the equation (3)

$$SF'(x) = \beta(x) SF(x) \quad (3)$$

if SF(x−1)−SF(x)>T, and by the equation (4)

$$SF'(x) = SF(x) \quad (4)$$

if the above condition is not met.

It is noted that SF'(x) in the above equations is the adjusted representative scale factor value, β(x) is a weighting function, T is a threshold value of the difference d, that is SF(x−1)−AF(x), and x, T are integer variables.

The weighting function β(x) maps values in a range of 0<β(x)<1 depending on the variable x. Although the same weighting function and threshold value T may be employed, these may also be variable depending on the frequency range and/or amplitudes.

It is possible for the weighting function β(x) to assume the contents shown by the equation (5):

$$SF'(x)=SF(x)-G(x) \quad (5)$$

Substituting the equation (5) into the equation (3), the following equation (6)

$$SF'(x)=SF(x)-G(x) \quad (6)$$

is obtained.

The above equation means that, if the condition SF(x−1)−SF(x)>T is met, a certain value G(x) is subtracted from the representative scale factor value of the band under consideration. Although the same subtrahend G(x) may be used, it may also be changed depending on the frequency band and/or amplitude for utmost effects.

With the above-described adjustment method for the representative scale factor value, taking advantage of the band-to-band masking different from that of the previous embodiment, the representative scale factor value of the band under consideration, which is masked by the band-to-band masking effect and hardly audible, may be adjusted to a lower value by the above-described processing operation.

One or both of the above-described two adjustment operations for the representative scale factor value, taking advantage of the band-to-band masking effects, is executed by the adjustment circuit 303 for adjusting the representative scale factor value based upon the band-to-band masking effects shown in FIG. 3. The resulting representative scale factor value, adjusted by taking the band-to-band making effect into account, is supplied to a spectral smoothness calculating circuit 308 and to an energy-dependent bit allocation circuit 304, such that calculation of the spectral smoothness and bit allocation taking into account the band-to-band masking effects may now be performed. The spectral smoothness calculating circuit 308 calculates, as an index indicating smoothness of the signal spectrum (so-called tonality), the sum of absolute values of the differences between neighboring values of the adjusted representative scale factor values divided by the sum of the adjusted representative scale factor values. The index of the smoothness of the signal spectrum may also be found from an output of the MDCT circuit.

An output of the spectral smoothness calculating circuit 308 is routed to a bit division ratio decision circuit 309 in which the division ratio between the allocation to the fixed bit allocation pattern and the Bark spectrum dependent bit allocation pattern is determined by the index indicative of the signal spectral smoothness.

The bit allocation circuit 304 determines the Bark spectrum dependent bit allocation data, using the adjusted representative scale factor value. Since the critical band width is narrower than the block floating band width for the higher frequency range, the bit allocation data is determined based upon the mean value of the plural adjusted representative scale factor values associated with the block floating band widths. On the other hand, since the critical band width is broader than the block floating band width for the low frequency range, a sole adjusted representative scale factor value is employed for determining the bit allocation data of the block floating unit.

The value indicating the division ratio for the allocation to the fixed bit allocation pattern from the bit division ratio decision circuit 309 is routed to a multiplier 313, while the value indicating the division ratio to the Bark spectrum dependent bit allocation is routed to a multiplier 312. The multiplier 313 is fed with data indicating the fixed bit distribution pattern from the fixed bit allocation circuit 305 and multiplies the fixed bit distribution pattern by the value indicative of the division ratio for the allocation to the fixed bit allocation pattern. The multiplier 312 is fed with the Bark spectrum dependent bit allocation data from the energy dependent bit allocation circuit 304 and multiplies the data with the value of the division ratio for the Bark spectrum dependent bit allocation.

These two values of bit allocation, that is the value of the bit allocation dependent upon the spectrum for each critical band from the multiplier 312 and the value of the fixed bit allocation from the multiplier 313, are summed at an additive node 306 and enter a bit allocation adjustment circuit 314. The bit allocation adjustment circuit 314 compares the total number of allocated bits from the additive node 306 and the total number of usable bits from the total bit number data generating circuit 302 to determine the ultimate bit allocation or so-called word length. That is, if the total number of allocated bits is less than the total number of usable bits, the number of allocated bits for the respective block floating units is increased, whereas, if the total number of allocated bits is larger than the total number of usable bits, the number of allocated bits for the respective block floating units is decreased. The ultimate bit allocation thus found is transmitted as the encoding parameter to the adaptive bit allocation encoding circuit 18. The ultimate bit allocation is also transmitted as the subsidiary encoding information.

Figure 7A:
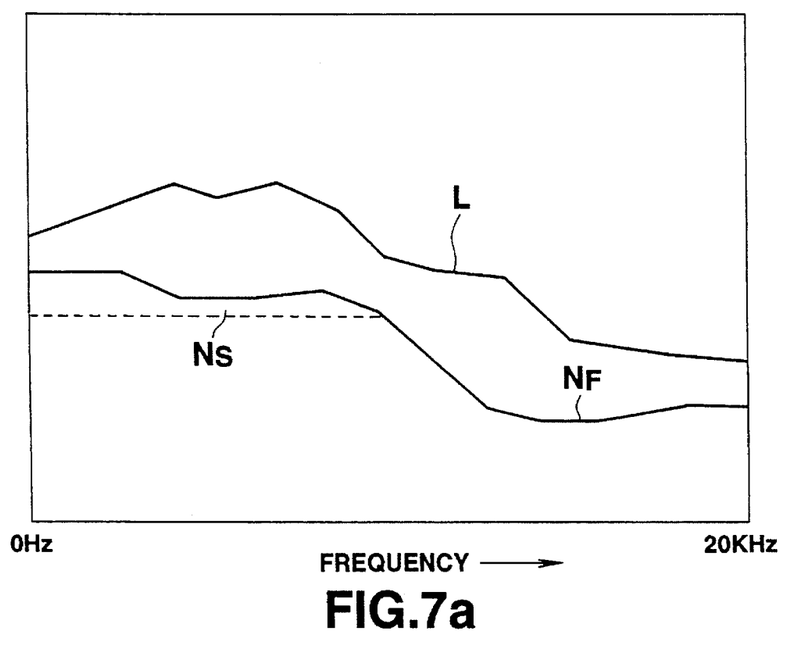
FIGS. 7A and 7B show the noise spectrum and bit allocation for a flatter signal spectrum for the second method of bit allocation.
Figure 7B:
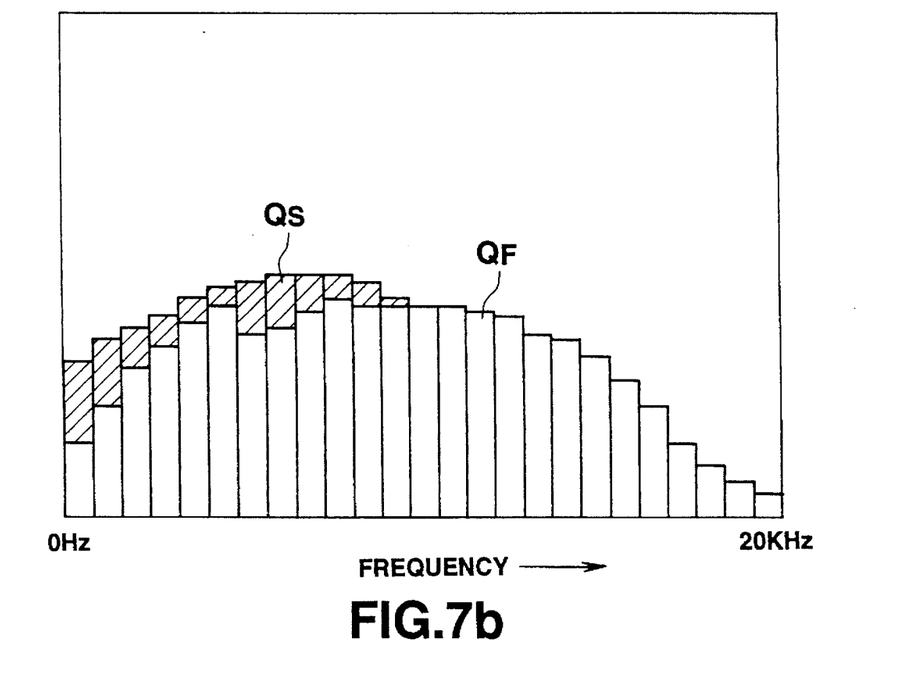
Figure 8A:
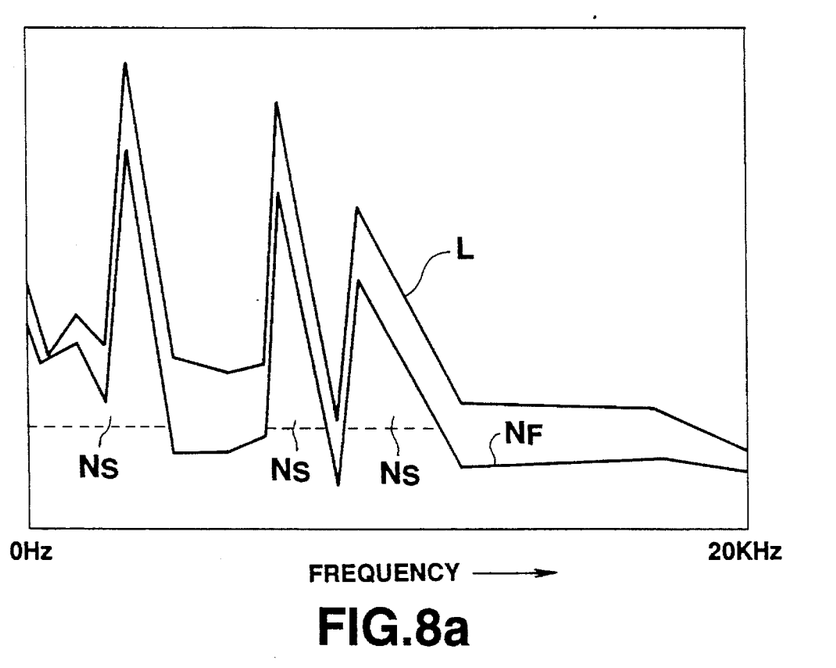
FIGS. 8A and 8B show the noise spectrum and bit allocation for a signal spectrum exhibiting high tonality for the second method of bit allocation.
Figure 8B:
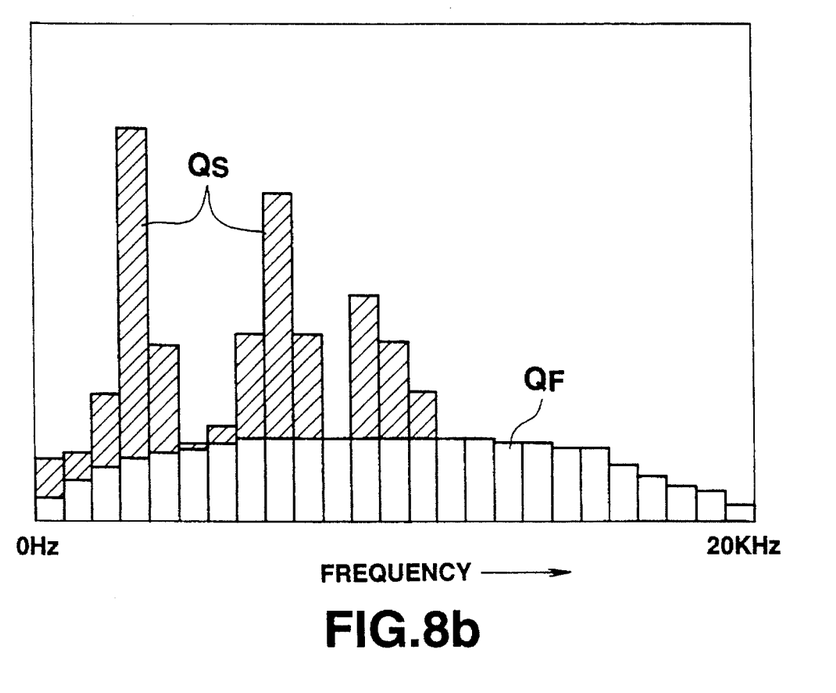

The manner of bit allocation is shown in FIGS. 7B and 8B. The state of the quantization errors associated with FIGS. 7B and 8B is shown in FIGS. 7A and 8A, respectively. FIGS. 7A and 7B show the case of a flatter signal spectrum and FIGS. 8A and 8B show the signal spectrum showing the case of high tonality. In FIGS. 7B and 8B, $Q_S$ indicates the signal level dependent bit quantity, while $Q_F$ indicates the bit quantity for the fixed bit allocation. In FIGS. 7A and 8A, L indicates the signal level, while $N_S$ and $N_F$ indicate the noise level reduction ascribable to the signal level dependent allocation and the noise level reduction ascribable to the fixed bit allocation, respectively.

In FIG. 7, a larger quantity of fixed bits allocated to the fixed bit allocation is useful in assuring a larger signal to noise ratio over the entire frequency range. However, in the case of FIG. 7, the bit allocation to the low frequency range and that to the high frequency range are rather small because these frequency ranges are less critical to the auditory characteristics. Also the noise level for the range having the larger signal magnitude is selectively lowered by the smaller quantity of signal level dependent bit allocation, as indicated by $Q_S$ in FIG. 7. Consequently, if the signal spectrum is flatter, the frequency range selectivity is operative for a rather wide range.

Conversely, if the signal spectrum shows high tonality, as shown in FIG. 8, reduction in the quantization noise due to the large quantity of the signal level dependent bit allocation is used for reducing the noise of extremely narrow ranges indicated by $N_S$ in FIG. 8. This enables the characteristics of the lone spectral input signal to be improved. Simultaneously, the noise level over a broad range may be selectively reduced by the small quantity of fixed bit allocation.

The present invention is not limited to the above-described embodiments. For example, the recording/reproducing medium need not be integrally connected to the other recording/reproducing medium and may be connected thereto by a data transfer network or the like. In addition, the present invention may be applied not only to apparatus for processing the audio PCM signals but also to apparatus for processing digital speech signals or digital video signals.

In addition, a variety of bit allocation methods may be employed. For example, the simplest fixed bit allocation, simple bit allocation based on the signal band energy or bit allocation consisting in the combination of the fixed and variable bit allocations, may be employed.

If there are input signals of plural channels, the representative scale factor values may be calculated for each critical band for each channel and adjusted by taking advantage of the band-to-band masking effects. In this manner, the representative scale factor values may be adjusted in such a manner as to take into account the band-to-band masking effects between the channels.

The arrangement for expanding or decoding the compressed data is explained.

Figure 9:
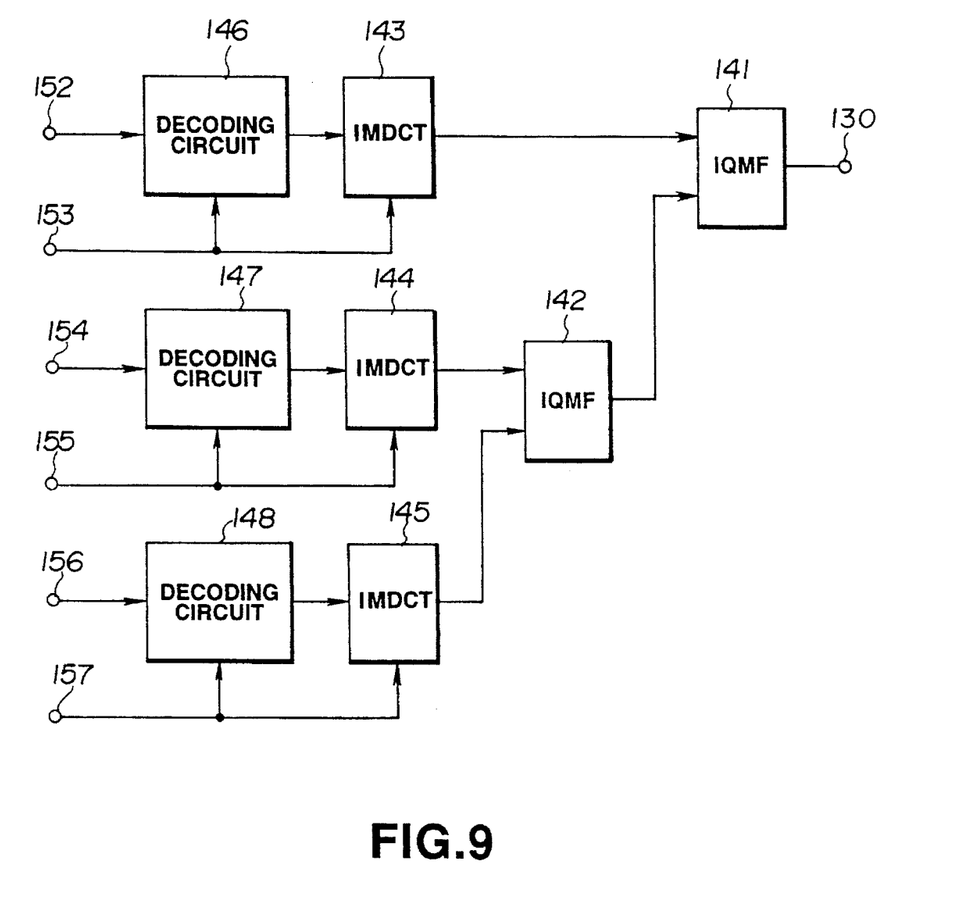
FIG. 9 is a block circuit diagram showing a specific example of a decoder for high efficiency compression coding employed in the bit rate compression coding according to the present invention.

Referring to FIG. 9, encoded data or compressed data from the encoder (arrangement for data compression) are supplied to input terminals 152, 155, 156, while subsidiary information data such as scale factors or word lengths are supplied from the encoder to input terminals 153, 155, 157. The compressed data and the subsidiary information are routed to decoding circuits 146, 147 and 148 where the compressed data are decoded based upon the subsidiary information data. The decoded or expanded data are transmitted to IMDCT circuits 143, 144, 145 executing an inverse operation of the MDCT operation by the MDCT circuits 13, 14 and 15. The above-mentioned subsidiary information data is also supplied to the IMDCT circuits 143, 144, 145. Consequently, the IMDCT operations by the IMDCT circuits 143 to 145 are also executed based upon the subsidiary information data. An output of the IMDCT circuit 143 is routed to a band synthesizing filter circuit (IMQF circuit) 142 executing an inverse operation of that of the band-dividing filter 12. An output of the band synthesizing filter circuit 142 is also transmitted to the band synthesizing filter circuit 141. Consequently, digital audio signals synthesized from the signals divided into the respective bands are outputted by the band synthesizing filter circuit 141. These audio signals are outputted at an output terminal 130.

It is seen from above that the present invention provides a method and apparatus for recording, reproducing, transmitting or receiving compressed data in which the masking effects for the auditory characteristics and/or the band-to-band masking effects may be exploited by having reference to neighboring plural high and low scale factors on the frequency axis for realizing high efficiency compression and expansion. In this manner, the superior sound quality may be realized for the same bit rate, while it becomes possible to prevent the sound quality from being deteriorated for the low bit rate.

What is claimed is:

1. A method for encoding audio signals comprising dividing input audio signals into a two-dimensional block of time and frequency and quantizing the two-dimensional blocks based upon bit allocation as determined for each of the two-dimensional blocks, wherein the improvement comprises the steps of calculating scale factors indicating characteristics of signal components for each of the plural two-dimensional blocks, and determining bit allocation for a pre-set one of the two-dimensional blocks based upon the scale factor of the pre-set two-dimensional block and plural scale factors of plural ones of the two-dimensional blocks neighboring to said pre-set two-dimensional block on the frequency axis.

2. The method as claimed in claim 1 wherein the step of determining the bit allocation comprises the steps of calculating a representative scale factor value for each critical band based upon calculated values of the plural scale factors, and determining bit allocation for the pre-set two-dimensional block based on said representative scale factor values.

3. The method as claimed in claim 2 wherein, if the band widths on the frequency axis of said two-dimensional blocks are narrower than said critical bands, the maximum or mean value of said plural scale factors is adopted as a representative scale factor value for each critical band, and wherein, if the band widths on the frequency axis of said two-dimensional blocks are broader than said critical bands, the scale factor of the pre-set two-dimensional block is adopted as a representative value for plural ones of the critical bands.

4. The method as claimed in claim 2 wherein the representative scale factor value of the pre-set critical band and plural representative scale factor values of plural ones of the critical bands neighboring on the frequency axis to said pre-set critical band are weighted for adjusting the representative scale factor value of the pre-set critical band.

5. The method as claimed in claim 4 wherein the weighing ratio is variable depending on frequency components or amplitude components of the input audio signals.

6. The method as claimed in claim 4 wherein the weighting is performed so that the representative scale factor value on the low frequency range side of the pre-set critical band is more influential than the representative scale factor value on the high frequency side of the pre-set critical band.

7. The method as claimed in claim 2 wherein the total number of the plural representative scale factor values of plural critical bands neighboring to the pre-set critical band on the frequency axis is variable depending on frequency components of the input audio signals.

8. The method as claimed in claim 2 wherein the representative scale factor value of the pre-set critical band is adjusted based upon the representative scale factor values of different channels.

9. An apparatus for encoding audio signals in which the input audio signals are divided into a two-dimensional block of time and frequency and the two-dimensional blocks are quantized based upon bit allocation as determined for each of the two-dimensional blocks, wherein the improvement comprises means for calculating scale factors indicating characteristics of signal components for each of the plural two-dimensional blocks, and means for determining bit allocation for a pre-set one of the two-dimensional blocks based upon the scale factor of the pre-set two-dimensional block and plural scale factors of plural ones of the two-dimensional blocks neighboring to said pre-set two-dimensional block on the frequency axis.

10. The apparatus as claimed in claim 9 wherein the means for determining the bit allocation comprises means for calculating a representative scale factor value for each critical band based upon calculated values of the plural scale factors, and means for determining bit allocation for the pre-set two-dimensional block based on said representative scale factor values.

11. The apparatus as claimed in claim 10 wherein, if the band widths on the frequency axis of said two-dimensional blocks are narrower than said critical bands, the maximum or mean value of said plural scale factors is adopted by said representative scale factor value calculating means as a representative scale factor value for each critical band, and wherein, if the band widths on the frequency axis of said two-dimensional blocks are broader than said critical bands, the scale factor of the pre-set two-dimensional block is adopted by said representative scale factor value calculating means as a representative value for plural ones of the critical bands.

12. The apparatus as claimed in claim 10 wherein said representative scale factor calculating means further comprises means for adjusting the representative scale factor value of the pre-set critical band and plural representative scale factor values of plural ones of the critical bands neighboring on the frequency axis to said pre-set critical band for adjusting the representative scale factor value of the pre-set critical band.

13. The apparatus as claimed in claim 12 wherein the weighing ratio is variable depending on frequency components or amplitude components of the input audio signals.

14. The apparatus as claimed in claim 12 wherein the weighting is performed by said representative scale factor value adjustment means so that the representative scale factor value on the low frequency range side of the pre-set critical band is more influential than the representative scale factor value on the high frequency side of the pre-set critical band.

15. The apparatus as claimed in claim 10 wherein the total number of the plural representative scale factor values of plural critical bands neighboring to the pre-set critical band on the frequency axis is variable depending on frequency components of the input audio signals.

16. The apparatus as claimed in claim 10 wherein the representative scale factor value calculating means further comprises means for adjusting the representative scale factor value of the pre-set critical band based upon the representative scale factor values of different channels.

17. A method for decoding encoded audio signals comprising the steps of dividing input audio signals into plural two-dimensional blocks of time and frequency, calculating a scale factor indicating characteristics of signal components for each of the plural two-dimensional blocks, receiving the information concerning bit allocation of said pre-set two-dimensional block as determined based upon the scale factor of the pre-set two-dimensional block and plural scale factors of plural ones of the two-dimensional blocks neighboring to said pre-set two-dimensional block on the frequency axis, and decoding the encoded audio signals, quantized based upon the information concerning the bit allocation, with the aid of the information concerning the bit allocation.

18. An apparatus for decoding encoded audio signals comprising means for dividing input audio signals into plural two-dimensional blocks of time and frequency, calculating a scale factor indicating characteristics of signal components for each of the plural two-dimensional blocks, receiving the information concerning bit allocation of said pre-set two-dimensional block as determined based upon the scale factor of the pre-set two-dimensional block and plural scale factors of plural ones of the two-dimensional blocks neighboring to said pre-set two-dimensional block on the frequency axis, and means for decoding the encoded audio signals, quantized based upon the information concerning the bit allocation, with the aid of the information concerning the bit allocation.

* * * * *